(12) United States Patent
Cooper

(10) Patent No.: US 6,795,106 B1
(45) Date of Patent: Sep. 21, 2004

(54) METHOD AND APPARATUS FOR CONTROLLING A VIDEO CAMERA IN A VIDEO CONFERENCING SYSTEM

(75) Inventor: Frederick J. Cooper, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/314,577

(22) Filed: May 18, 1999

(51) Int. Cl.[7] .............................................. H04N 7/14
(52) U.S. Cl. ............................ 348/14.08; 348/14.09; 348/14.07
(58) Field of Search .................... 348/14.01–14.09, 348/14.1, 14.11, 14.12, 14.13; 382/100; H04N 7/14

(56) References Cited

U.S. PATENT DOCUMENTS

| | | |
|---|---|---|
| 4,239,356 A | 12/1980 | Freudenschuss et al. |
| 4,449,238 A | 5/1984 | Lee et al. |
| 4,764,817 A | 8/1988 | Blazek et al. |
| 5,206,721 A | 4/1993 | Ashida et al. |
| 5,657,246 A | 8/1997 | Hogan et al. |
| 5,841,763 A | 11/1998 | Leondires et al. |

FOREIGN PATENT DOCUMENTS

| | | | | |
|---|---|---|---|---|
| JP | 402067889 A | * | 3/1990 | ............ H04N/7/15 |
| JP | 05-244587 | * | 9/1993 | ............ H04N/7/15 |
| JP | 08-223551 | * | 8/1996 | ............ H04N/7/15 |
| JP | 09-009234 | * | 1/1997 | ............ H04N/7/15 |

* cited by examiner

*Primary Examiner*—Melur Ramakrishnaiah
(74) *Attorney, Agent, or Firm*—Paul E. Steiner (57) ABSTRACT

A video conference station is disclosed comprising an image analyzer and a camera controller. The image analyzer receives video frames from a communicatively coupled first camera, detects the head of one or more conference participants within the received video frames and detects an active participant from the one or more conference participants. The camera controller, coupled to the image analysis circuit, controls a second camera based, at least in part, on detecting the active participant.

17 Claims, 9 Drawing Sheets

METHOD AND APPARATUS FOR CONTROLLING A VIDEO CAMERA IN A VIDEO CONFERENCING SYSTEM

BACKGROUND OF THE INVENTION

1. Field of the Invention

The present invention generally relates to the field of video conferencing and, more particularly, to a method and apparatus for controlling a video camera in a video conferencing system.

2. Background Information

Video conferencing systems are known in the art. Video conferencing systems are available in a wide range of systems with a corresponding variety of features and capabilities. Personal computer (PC) video conferencing systems, for example, offer a flexible video conferencing solution to the masses. That is, with the addition of a video/sound board and a PC video camera, a standard home/business computer system may be transformed into a video conferencing system, while retaining all of the standard computing capability inherent in the computer system.

Even within the market of PC video conferencing systems, the capabilities and features vary between vendors and between market price points within a vendor's offerings. For example, the ProShare® Video Conferencing system from Intel Corporation provides a personal computer with the ability to engage in a video conference with other compatibly enabled computer(s). With the ProShare® and most other PC video conferencing systems, a video camera sits atop the computer monitor and points in the general vicinity of the local user. In more advanced PC video conferencing systems, the focal length of the local video camera may be controlled by the local user to zoom in/out. That is, the local user may adjust the focal length of the local camera (e.g., zoom in/out) to control the size of the image depicted within the video conference window of the remote video display unit.

Stand alone video conferencing systems (or, dedicated video conferencing systems) are also well known, and also offer a broad range of video conferencing features and capability. In general, many of the stand alone video conferencing systems include camera control systems at either end of the video conferencing system, allowing local users with a remedial ability to manually control the remote video camera.

These prior art systems, however, require that a local user manually adjust the field of focus (e.g., "pan", "steer", or otherwise position) the remote video camera to locate the actual remote speaker, manually "frame" the speaker (e.g., center the image within the frame of the video window) and adjust the focal length (e.g., zoom) of the remote video camera via some sort of local camera control mechanism (e.g., keyboard control). Novice users of such video conferencing systems find, however, that the camera control mechanism of these prior art conferencing systems are not intuitive or easy to use. They often have a lag time associated with their operation, thereby causing the remote video camera to "overshoot" the desired object when panning to view a particular object. In addition, many of the prior art cameras also required the user to manually focus and/or zoom the camera when the object of interest was ultimately framed. These and other shortcomings of the prior art made their use inefficient, e.g., conference participants spent an inordinate amount of time positioning the camera equipment, causing many potential conference participants to opt for alternative conferencing mediums with which to conduct their conference.

In response, certain manufacturer's of video conferencing system have introduced automated video camera control systems which obviate the need for manual control by conference participants. Many of these automated video camera control systems rely on a network of distributed microphones to locate a speaking conference participant within a room, and an "auto-focus" camera system to ensure the clarity of the picture. One such prior art system is disclosed in U.S. Pat. No. 5,206,721 to Ashida, et al. and commonly assigned to Fujitsu Limited. Those skilled in the art will appreciate that such prior art systems suffer from a number of inherent limitations.

First, the accuracy of these automated video camera control systems are greatly dependent upon the number of microphones used in the system and the distribution of these microphones, and the number of video conference participants. That is, if the video conferencing station has only two microphones, the accuracy of the automated video camera controller is quite limited, even if the microphones are widely distributed (e.g., opposite sides of the room). Second, the accuracy of these prior art automated camera control systems is inversely related to the number of conference participants. That is, the accuracy of the automated camera control systems is diminished as the number of simultaneous speakers increases.

Thus, an improved camera control system is needed that is unencumbered by the deficiencies and limitations commonly associated with the prior art.

SUMMARY OF THE INVENTION

In accordance with the teachings of the present invention, a method and apparatus for the control of a remote video camera is disclosed. In a first example embodiment of the present invention, an innovative video conference station is disclosed comprising an image analyzer and a camera controller. The image analyzer receives video frames from a communicatively coupled first camera, detects the head of one or more conference participants within the received video frames and detects an active participant from the one or more conference participants. The camera controller, coupled to the image analysis circuit, controls a second camera based, at least in part, on detecting the active participant.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention. Furthermore, for the method steps of the present invention, for ease of explanation, certain method steps are described with multiple method steps "in sequence", however, they should not be construed as necessarily order dependent in their performance.

Reference in the specification to "one embodiment" or "an embodiment" means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Those skilled in the art will appreciate, from the description to follow, that the present invention is comprised of two innovative aspects which provide a video conferencing station with automated camera control capabilities unencumbered by limitations commonly associated with the prior art, as well as an automatic identification function to automatically identify video conference participants and providing descriptive information associated therewith to remote video conference stations. Although the innovative functions and features of the present invention will be described with reference to various example embodiments, those skilled in the art will appreciate that, fundamentally, the present invention utilizes face recognition technology to determine the number of conference participants, to monitor conference participants to determine active conference participants and to identify interested conference participants (e.g., the determined active participant, or any other participant identified by a remote conference station). Based on this information, an innovative video conferencing station incorporating the teachings of the present invention controls a camera to "feature" (e.g., frame, zoom and focus) an interested party such as, for example, the active conference participant, as well as including available descriptive information identifying the conference participant in the video feed (e.g., in a sideband, the vertical blanking interval, or within the main video channel itself). Accordingly, deviations from the following example embodiments may well be made without departing from the spirit and scope of the present invention.

Figure 1:
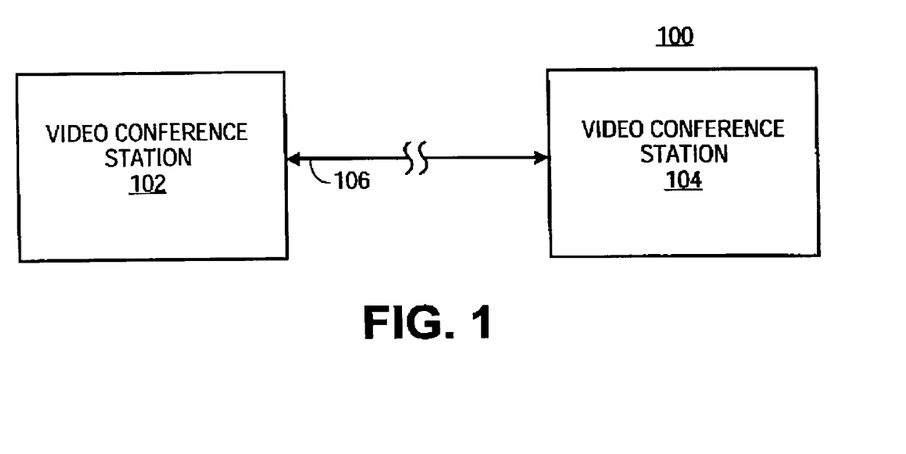
FIG. 1 is a block diagram of an example video conferencing system within which a video conference station incorporating the teachings of the present invention can be used, in accordance with one embodiment of the present invention.

Referring now to FIG. 1, a block diagram illustrating an example video conferencing system 100 within which the teachings of the present invention may be practiced is presented. In accordance with the illustrated example embodiment of FIG. 1, video conferencing system 100 is shown comprising two video conferencing stations, video conferencing station 102 and video conferencing station 104, communicatively coupled via communication channel 106. As will be described in greater detail below, a video conferencing station (e.g., video conferencing station 102 or video conferencing station 104) incorporating the teachings of the present invention includes an innovative image analyzer utilizing face recognition technology to analyze and monitor video frames received from a first camera to automatically detect an interested party such as, for example, an active conference participant (i.e., main speaker) from one or more local conference participants. In one embodiment, this function is invoked upon detecting audio from one or more of the audio input sources (described more fully below). The information obtained from the innovative image analyzer is used by a communicatively coupled camera controller to control one or more secondary video cameras to "feature" (i.e., pan, frame and zoom in on) the active conference participant based, at least in part, on the video analysis. In accordance with a second aspect of the present invention, a video control station endowed with the present invention may additionally identify the person detected as the active conference participant and transmit descriptive information regarding the active conference participant, e.g., in a sideband, the vertical blanking interval (VBI) or the main channel of the video content to a remote video conference station. Thus, unlike the automated control systems of the prior art which rely solely on audio input to control camera position, a innovative video conference station incorporated with the teachings of the present invention utilizes innovative video analysis to detect an active conference participant. These and other aspects of the present invention will be developed more fully with reference to FIGS. 2 through 6 below.

Although video conferencing system 100 is depicted comprising two (2) video conferencing stations, those skilled in the art will appreciate that this is for illustrative purposes only, as the teachings of the present invention in no way limits the number of video conferencing stations a video conferencing system may include. Consequently, FIG. 1 might well be depicted comprising a plurality of video conferencing stations, with up to a corresponding plurality of the video conferencing stations incorporated with the teachings of the present invention.

In accordance with the illustrated example embodiment of FIG. 1, video conferencing station 102 is depicted as communicatively coupled to video conferencing station 104 via communication channel 106, which is operative to transport the video content (e.g., video feed) and the audio content (audio feed) comprising the video conferencing signals between any of a plurality of video conferencing stations including video conferencing station 102 and video conferencing station 104. In accordance with the example embodiment of FIG. 1, communication channel 106 is intended to represent a broad category of wireline and wireless communication channels known in the art. For example, communication channel 106 may be a plain old telephone services (POTS) channel, an Integrated Services Digital Network (ISDN) channel, a channel within an T1 or E1 trunk line, Internet communication channel, intranet communication channel, or any of a number of alternate wireline communication channels. In an alternate embodiment, communication channel 106 represents a broad category of wireless communication channels including, but not limited to, a cellular communication channel, a personal communication services (PCS) channel, a two-way paging channel, a microwave communication channel, a satellite communication channel, and the like. In yet another embodiment, communication channel 106 is intended to represent a combination of wireline and wireless communication channels, wherein at one end-point, e.g., video conferencing station 102, communication channel 106 is a wireline communication channel, whereas at another end-point, e.g., video conferencing station 104, communication channel 106 is a wireless communication channel. Similarly, communication channel 106 is intended to transport video conferencing signals adhering to any of a number of video conferencing standards known in the art such as, for example, the H.323 standard for "Visual Telephone Systems and Equipment for Local Area Networks Which Provide a Non-Guaranteed Quality of Service" (November, 1996), the T.120 standard entitled "Data Protocols for Multimedia Conferencing" (July, 1996) (and its associated standards), each promulgated by the International Telecommunications Union (ITU).

Figure 2A:
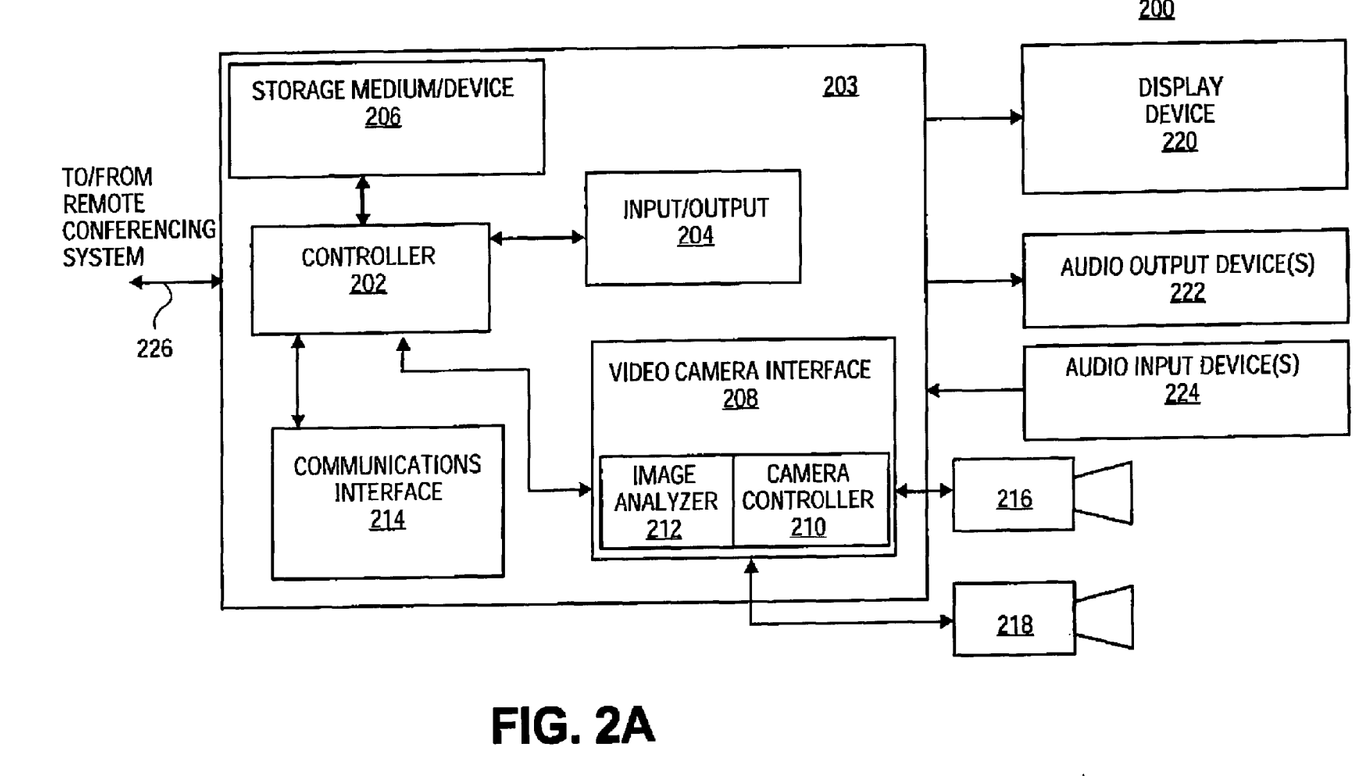
FIGS. 2A and 2B are block diagram illustrations of example video conference stations incorporating the teachings of the present invention, in accordance with alternate embodiments of the present invention.
Figure 2B:
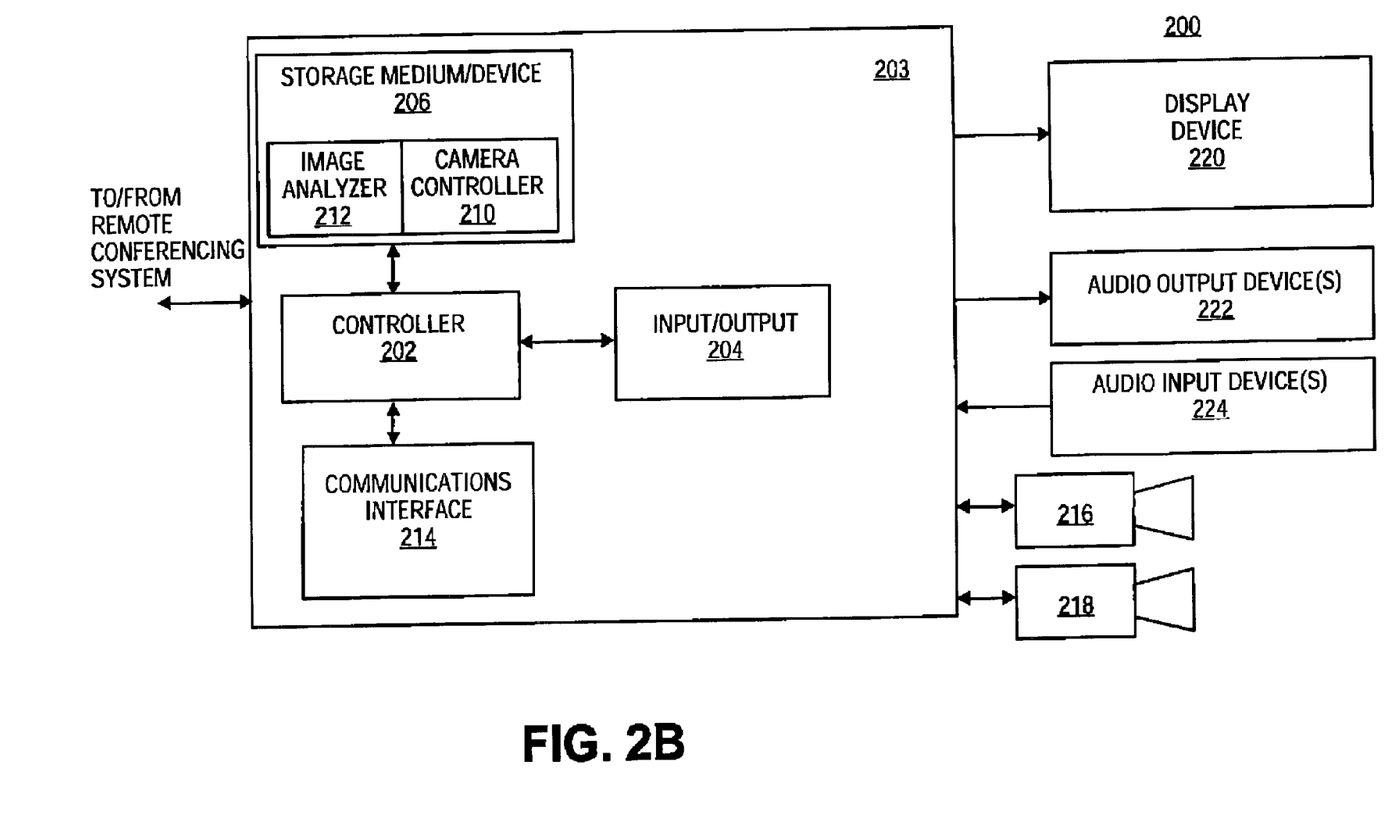

Having briefly introduced the operating environment within which the teachings of the present invention may be practiced, an innovative video conference station incorporating the teachings of the present invention will be presented with reference to the alternate embodiments of FIGS. 2A and 2B.

Turning to FIG. 2A, a block diagram of an example video control station 200 incorporating the teachings of the present invention is depicted, in accordance with one embodiment of the present invention. As described herein, video conference station 200 may well be beneficially incorporated into video conferencing system 100 as video conference station 102 and/or 104. As depicted in the illustrated example embodiment of FIG. 2A, video conference station 200 is shown comprising controller 202, input/output controller 204, storage medium/device 206, video camera interface 208, communications interface 214, panoramic camera 216, control camera 218, display device 220, audio output device (s) 222 and audio input device(s) 224, each communicatively coupled as depicted. In accordance with this example embodiment of the present invention, video camera interface 208 depicted as a stand-alone device including image analyzer 212 and camera controller 210 incorporating the teachings of the present invention. In this embodiment, video camera interface 208 analyzes video frames received from panoramic camera 216 to detect an active conference participant (i.e., an active speaker), whereupon camera controller 210 manipulates control camera 218 to frame and focus control camera 218 to "feature" the active conference participant. Further, image analyzer 212 accesses one or more signature databases (not shown) to identify the person detected as the active conference participant. If successful, descriptive information about the speaker may well be included in the video content (e.g., in the vertical blanking interval (VBI) or a sideband channel) that is transmitted to remote video conference stations.

Although video camera interface 208 and associated image analyzer 212 and camera controller 210 are depicted as separate functional blocks in FIG. 2A, those skilled in the art will appreciate that the functionality of video camera interface 208 may well be embodied in executable software, and executed by controller 202. Just such an alternate embodiment is presented with reference to FIG. 2B. As shown in FIG. 2B, storage medium/device 206 includes executable instructions for image analyzer 212 as well as camera controller 210, which are selectively executed by controller 202 to implement the functions of the present invention.

As illustrated in FIG. 2A, video conference station 200 captures local audio and video content (e.g., the audio feed and video feed) from audio input device(s) 224, panoramic camera 216 and control camera 218, respectively. The audio and video feed is selectively edited and formatted for transmission to remote video conference stations by controller 202, in accordance with any of a number of known audio/video communication standards via communication channel(s) 226. In one embodiment, controller 202 implements a coder/decoder (sometimes referred to as a CODEC) to encode/decode the audio/video in accordance with any of a number of video conferencing protocols now known or hereafter discovered.

In accordance with one embodiment of the present invention, to be described more fully below, video camera interface 208 analyzes video received from a local panoramic camera (e.g., camera 216) to detect an active participant from a plurality of local conference participants, manipulates a control camera (e.g., camera 218) to "feature" (i.e., pan, zoom and focus) the active participant, and selects which camera is to supply the video feed to the remote video conference station. In this regard, image analyzer 212 monitors the received video from panoramic camera 216 (which is statically positioned to capture/frame the active conference space) to detect the head (roughly, an oval shape) of conference participants, and to monitor the lower half of the detected heads for movement that would denote that the participant is speaking (i.e., an active participant). The head detection aspect of the present invention is performed using face recognition technology. Such face recognition technology is known in the art, as evidenced by the FaceIt® suite of products offered by Visionics Corporation, of Jersey City, N.J. 07302. Accordingly, image analyzer 212 detects the head of conference participants and monitors the movement of the lower half of the heads to detect motion denoting speech. As will be described in greater detail below, upon detecting the head of conference participants, image analyzer 212 alone, or in combination with controller 202, develops at least a video signature of each of the conference participants and accesses a database of signatures (local or remote) to identify detected conference participant(s). Once identified, descriptive information regarding the conference participant(s) is retrieved and included in a sideband or vertical blanking interval (VBI) of the transmitted image to remote video conference stations.

In addition, controller 202 also receives audio and video signals from remote video conferencing station(s) via communication channel(s) 204. In one embodiment, the audio signals and the video signals are separate and distinct, whereas in an alternate embodiment, the audio and video signals are received as a composite audio/video (A/V) signal. In the illustrated example embodiment, controller 202 may beneficially receive such signals in either format. The received signals are processed by controller 202, wherein controller 202 decompresses the received audio and video signals via the CODEC described above, as appropriate, and forwards them to the audio output device(s) 222 and display device 220 for rendering.

Although depicted as separate elements, those skilled in the art will appreciate that any or all of video camera interface 208, input/output controller 204, communications interface 214 and the like may well be incorporated into a common device, e.g., controller 202. Further, controller 202 is intended to represent any of a number of alternative controllers available in the art including, but not limited to, a microcontroller, a central processing unit (a.k.a., processor), an Application Specific Integrated Circuit (ASIC), and the like.

Video display unit 220 is used to display data and video images. In one embodiment, video display unit 220 is intended to represent a broad category of displays known in the art including, but not limited to, computer monitors, televisions, flat panel displays, liquid crystal displays, and the like. Similarly, except for the teachings of the present invention, video camera(s) 216 and 218 are also intended to represent any of a number of alternative video cameras known in the art. As used herein, video camera 216 is a panoramic camera utilized to fame and capture the entire video conference space. Video camera 218 is also referred to as a control camera as it is controlled by video conference station to "feature" the active conference participant identified by image analyzer 212. Each of the video cameras is used to capture and convert video images of conference participant(s) at each of video conferencing stations 102 and 104, respectively, into video conferencing signals for video conferencing stations 104 and 102, respectively.

Audio input device(s) 224 (e.g., microphone(s)) perform their conventional functions of capturing and converting audio signals into electrical signals. Audio output device(s) 222 (e.g., speakers) perform their conventional function of receiving electrical signals and rendering audio signals. Accordingly, except as used in conjunction with the teachings of the present invention, audio input device(s) 224 and audio output device(s) 222 are intended to represent a broad category of these elements commonly found in video conferencing systems. In addition, although not shown, video conference stations commonly have user input devices and video conference station 200 may also utilize such a device enabling manual command and control of select features of video conference station 200.

While for ease of explanation, display device 220, video cameras 216 and 218, audio input device(s) 224, and audio output device(s) 222 are illustrated as separate functional blocks, those skilled in the art will appreciate that any combination of these functions may well be combined and embodied in the same physical unit in any number of ways. For example, audio input devices 224 and audio output 222 may well be combined into a single "headset", whereas video display device 220 and one or more of video cameras 216 and/or 218 may well be embodied in a single display/camera unit. Similarly, video display device 220 may well incorporate audio input devices, speakers and one or more video cameras into a complete self-contained multi-media system.

Figure 3:
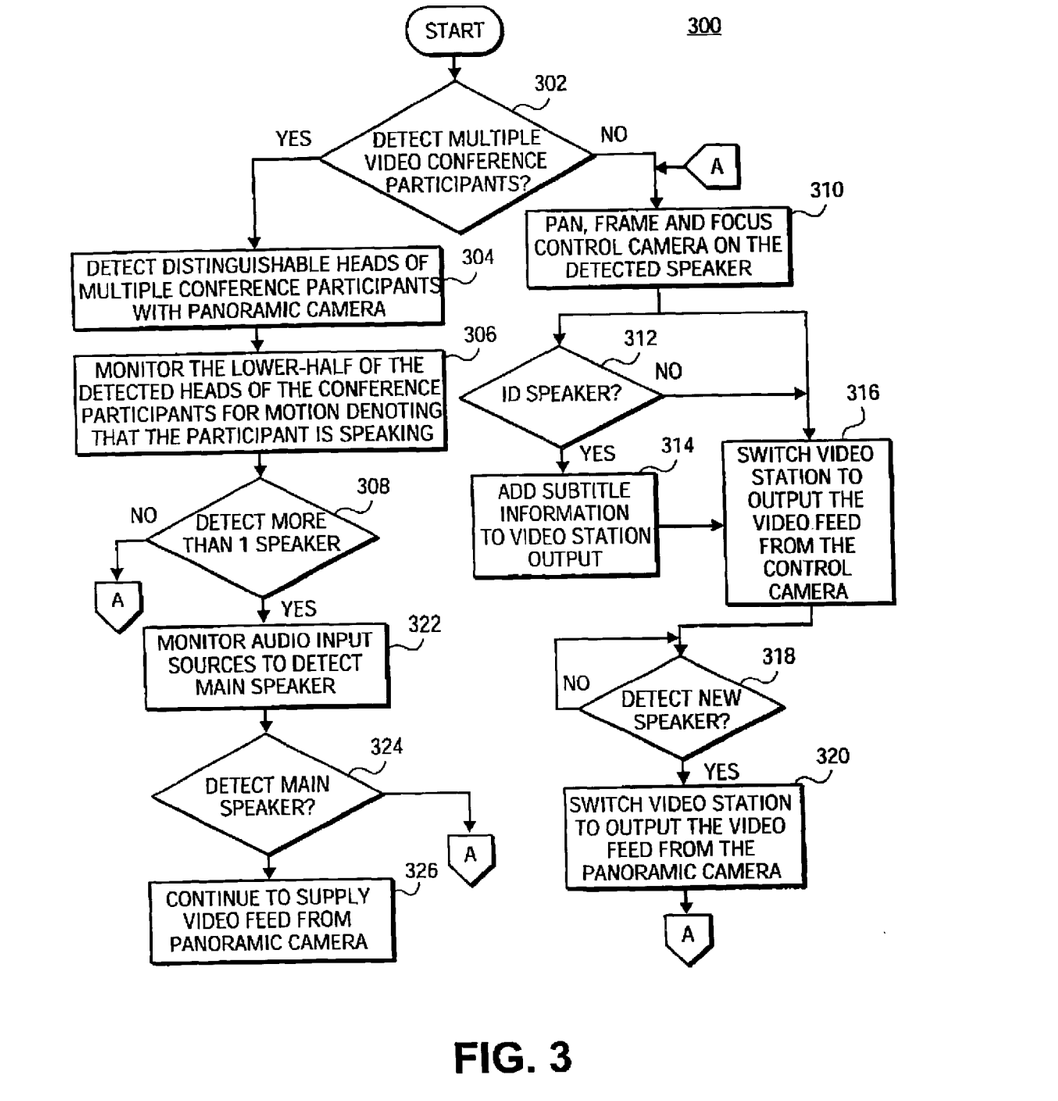
FIG. 3 is a flow chart illustrating an example method for controlling the video facilities of a video station engaged in a video conference session, in accordance with one aspect of the present invention.

Given the foregoing architectural description of the example video conference system control unit, an example method for controlling the video facilities of a video conference station incorporated with the teachings of the present invention is depicted in the flow chart depicted in FIG. 3, in accordance with one embodiment of the present invention. For ease of explanation, and not limitation, the operation of video conference system control unit 200 of FIG. 2A will be developed with reference to the example flow chart depicted in FIG. 3 and continued reference to FIG. 1.

Accordingly, the example method of FIG. 3 begins with block 302, wherein image analyzer 212 of video conference station 200 determines whether multiple video conference participants are detected. More specifically, image analyzer 212 continuously monitors the video feed from panoramic camera 216 to determine whether more than one conference participant is involved in a video conference session and, if so, distinguishes the number of conference participants in block 304. In one embodiment, face recognition technology is employed by image analyzer 212 to distinguish the heads and faces of conference participants. It should also be noted that at this point, i.e., before an active conference participant has been identified, or if the input from available audio input sources does not exceed a minimum threshold, video conference station 200 supplies as video output to remote video conference stations the video feed from panoramic camera 216.

Once multiple conference participants have been distinguished, block 304, image analyzer 212 monitors a portion of the video feed from panoramic camera associated with the lower-half of the detected heads for motion denoting speech on the part of the conference participants, block 306. In one embodiment, the function is invoked when the input from available audio sources exceeds some threshold. If, in block 308, image analyzer 212 detects only one (1) active speaker among the conference participants, image analyzer 212 provides camera controller 210 with positioning information and camera controller 210 manipulates control camera 218 to feature the active conference participant, block 310. In one embodiment, camera controller 210 instructs the control camera to pan to a particular location, frame (e.g., center) the object located at the particular location and to focus the camera so as to "feature" the active conference participant.

In accordance with one embodiment of the present invention, once control camera 218 has completed the pan, frame and focus sequence, controller 202 switches the video output to the remote video conference stations to transmit the video feed from control camera 218, block 316. In parallel, image analyzer 212 attempts to identify the person detected as the active conference participant, block 312. As described above, image analyzer 212 accesses one or more communicatively coupled signature databases (not shown) to identify the detected active conference participant. An example method for identifying the person detected as the active participant is provided with reference to the flow chart depicted in FIG. 4.

Figure 4:
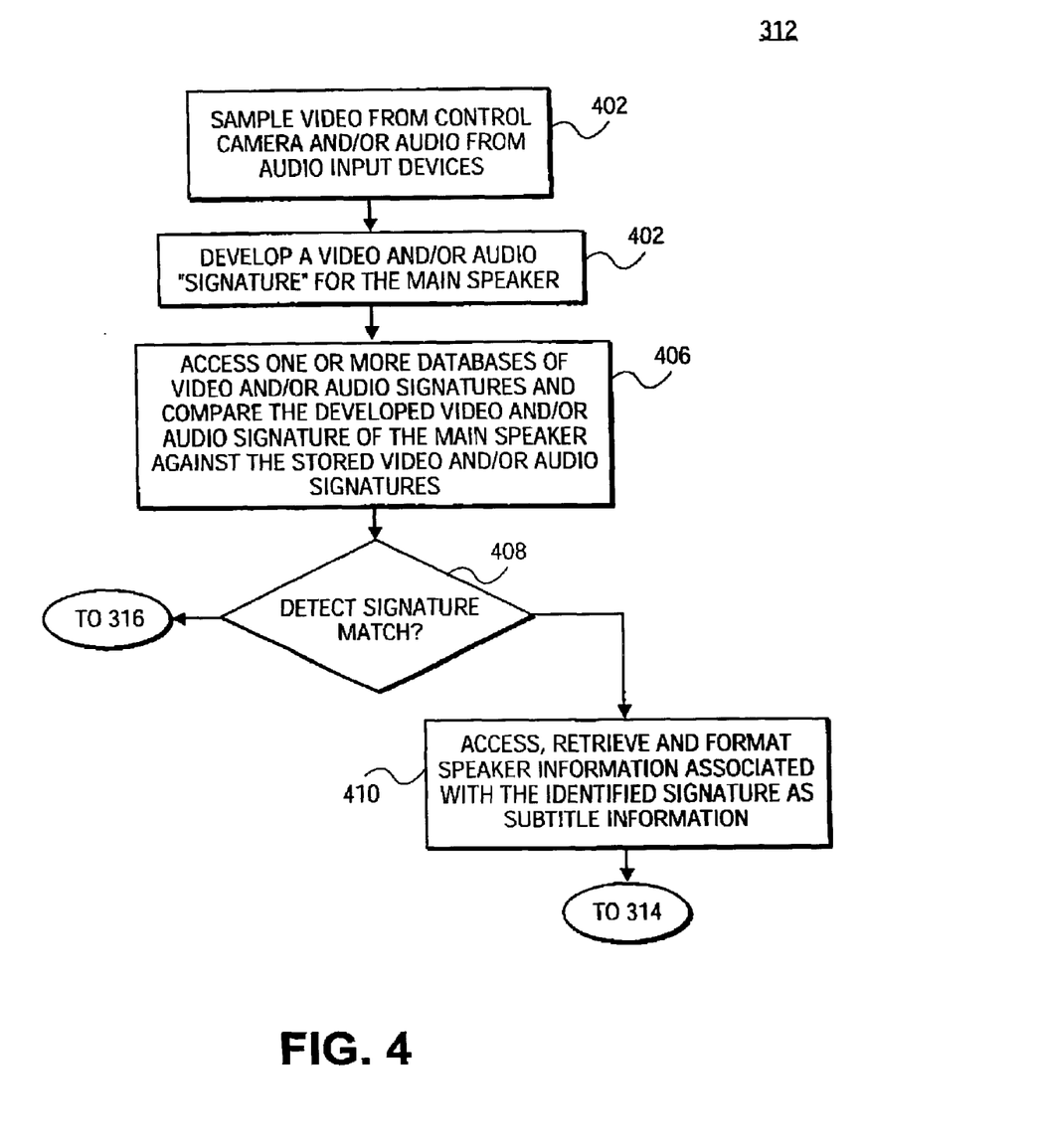
FIG. 4 is a flow chart illustrating an example method for identifying video conference participants to interject speaker information in the video feed from the video conference station, in accordance with one aspect of the present invention.

Turning briefly to FIG. 4, a flow chart of an example method for identifying a video conference participant is presented, in accordance with one embodiment of the present invention. As shown, the method begins with block 402 wherein image analyzer 212 samples video from control camera 218, while controller 202 samples audio from audio input device(s) 224. In block 404, a video and/or audio "signature" of the active conference participant is developed. In block 406, image analyzer 212 and/or controller 202 accesses one or more databases containing video and/or audio signature information and compares the developed signature against the stored signatures. In one embodiment, for example, where the signature database is located within video conference station, e.g., on storage medium/device 206, image analyzer 212 may access the database directly, or with the support of controller 202. In an alternate embodiment, wherein the signature database is located remotely, image analyzer 212 accesses the remote database employing the networking facilities of controller 202 and communications interface 214.

If, in block 408, a match is detected between the developed signature and a stored signature, image analyzer 212 and/or controller 202 access retrieve and formats descriptive information associated with the identified speaker for transmission to remote video conference stations, block 410. In particular, image analyzer 212 or controller 202 retrieve the descriptive information associated with the identified person from the signature database (or another database referenced from or otherwise associated with) signature database, and provides such information to the remote video conference stations as subtitle text in a sideband or vertical blanking interval (VBI) of the video content, as the process continues with block 314.

Returning to FIG. 3 and, in particular, block 318, video conference station 200 continues to transmit the video feed from control camera 218, while image analyzer 212 continues to monitor the entire video conference area with panoramic camera 216 for another/new active conference participant. If another/new active conference participant is detected in block 318, video conference station 200 switches to transmit the video feed from panoramic camera 216, block 320, and the process continues with block 310.

If, in block 308, more than one (1) active conference participant is detected, controller 202 of video station 200 monitors the input from audio input device(s) 224 to attempt to detect the main active conference participant, block 322. In one embodiment, for example, controller 202 receives information from image analyzer 212 denoting all detected active participants and, from this information, controller 202 analyzes the audio feed from particular ones of a plurality of microphones. In an alternate embodiment, wherein image analyzer 212 not only detects but identifies those persons actively participating, controller 202 retrieves voice signature information from (or associated with) the signature database for each of the identified participants, and then attempts to determine, from the voice signatures, which active participant is the main active participant, i.e., which person is speaking the loudest, block 324. If a main active participant is identified in block 324, the process continues with block 310. If no main active participant is identified in block 324, controller 202 continues to transmit the video feed from panoramic camera 216 to the remote video conference stations.

Figure 5:
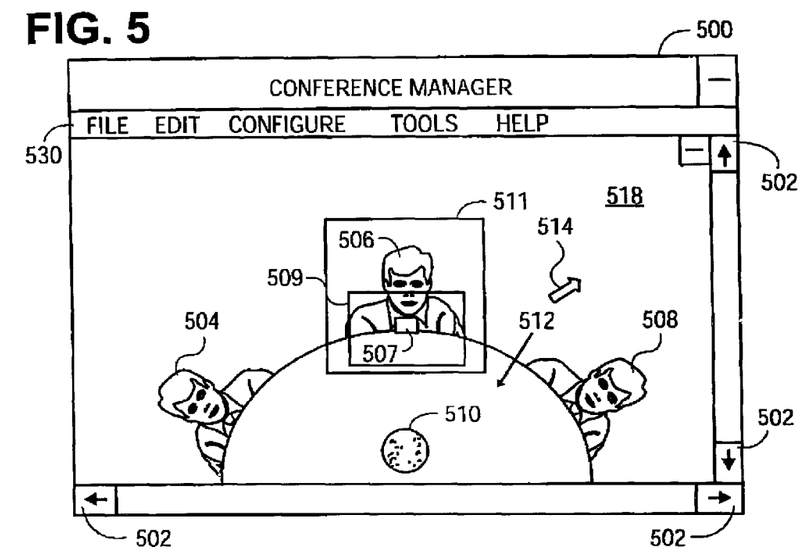
FIG. 5 is an illustration of an example video display of a conference manager application, in accordance with one embodiment of the present invention.

Having described video conference system control unit 200 and its associated method of operation, in accordance with the teachings of the present invention, an example implementation will be described in the context of the example video display of a conference manager application depicted in FIGS. 5 and 6, with continued reference to FIGS. 1 through 4. As shown, FIG. 5 represents an example video conference window displayed on local video display unit 220, wherein a number of objects are depicted. In particular, FIG. 5 is an illustrative representation of the display of a conference manager application 500, having menu bar 530 and video conference window 518, cursor control points 502 and cursor 514.

As depicted in the illustrated example conference manager window 500 shown in FIG. 5, video conference window 518 contains a simplistic representation of the video feed from panoramic camera 216 capturing video of a conference space containing three individuals 504, 506 and 508 sitting around conference table 512 containing microphone/speaker 510. In accordance with the teachings of the present invention, as presented above with respect to FIGS. 1–4, image analyzer 212 uses face recognition technology to detect multiple conference participants 504, 506 and 508 and to monitor the lower half of each detected face for movement denoting speech.

Figure 6:
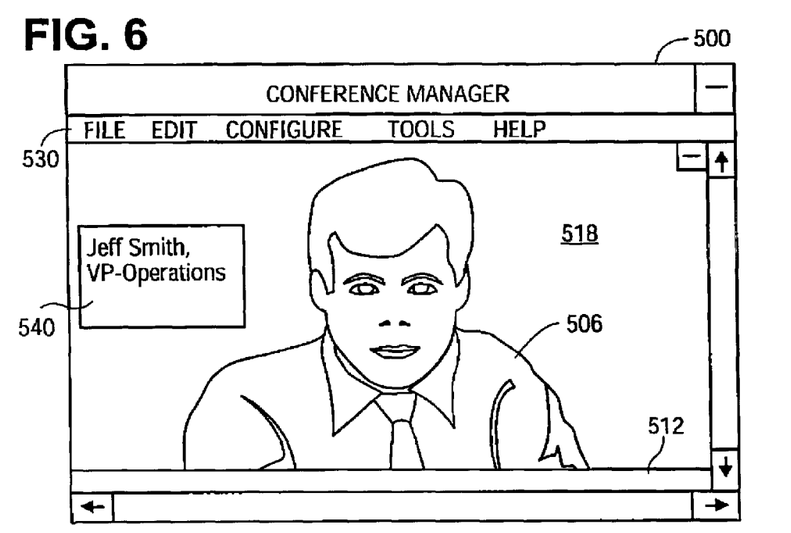
FIG. 6 is an illustration of an example video display of a conference manager application, in accordance with one embodiment of the present invention.

FIG. 6 provides an illustration of the video feed from control camera 218 in conference manager window 500 modified to "feature" the detected active participant from the video conference window illustrated in FIG. 5. It should be noted that while the controller 202 has selected the video feed from control camera 218 in response to detecting the active conference participant, the video feed from panoramic camera 216 is still presented to image analyzer 212, which continues to monitor the panoramic feed to identify new/additional active conference participants, in accordance with the method of FIG. 3. In accordance with the second aspect of the present invention, if image analyzer 212 or controller 202 (depending on the embodiment) identifies the person detected as the active conference participant, in accordance with the method of FIG. 4, a text box (or subtitles) are provided depicting descriptive information of the active conference participant. An example of this feature is presented in FIG. 6 with text box 540 identifying the displayed active conference participant as "Jeff Smith, VP—Operations". As described above, this information was retrieved from signature file database and/or other associated databases.

Figure 7:
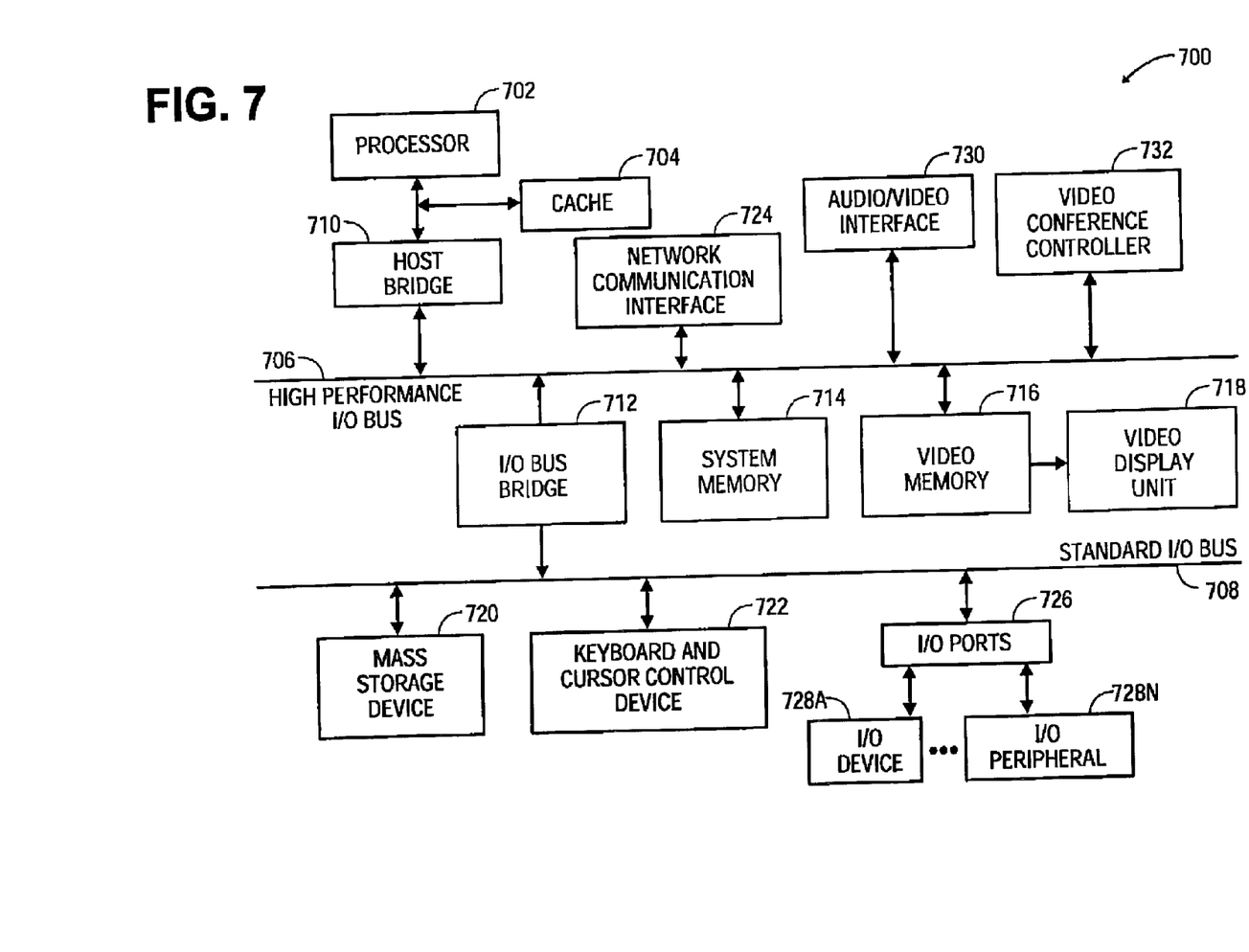
FIG. 7 is a block diagram illustration of an example computer system incorporating the teachings of the present invention, in accordance with one embodiment of the present invention.

Turning to FIG. 7, a block diagram illustrating one embodiment of a computer system (e.g., system 700) incorporated with the teachings of the present invention for automatically controlling a remote video camera is shown. In one embodiment, system 700 is beneficially integrated into video conferencing system 100 as video conference system control unit 102 and/or 120. In accordance with the illustrated example embodiment, system 700 includes at least one processor (e.g., processor 702) and cache memory 704 coupled to each other as shown. Additionally, system 700 includes high performance input/output (I/O) bus 706 and standard I/O bus 708, as shown. Host bridge 710 couples processor 702 to high performance I/O bus 706, whereas I/O bus bridge 712 couples high performance I/O bus 706 to standard I/O bus 708. Coupled to high performance I/O bus 706 are network/communication interface 724, system memory 714, audio/video interface board 730, video conference controller 732 and video memory 716. In turn, display device 718 is coupled to video memory 716. Coupled to standard I/O bus 708 are mass storage device 720 keyboard and pointing device 722, and I/O ports 726. In one embodiment, keyboard and pointing device are coupled to standard I/O bus 708 with a serial communication interface cable, while in alternate embodiments it may be communicatively coupled with an infrared (IR) interface or a radio-frequency (RF) interface.

With continued reference to FIG. 7, elements 702–730 perform their conventional functions as known in the art. In particular, network/communication interface 724 is used to provide communication between system 700 and any of a wide range of conventional networks, such as Ethernet, token ring, the Internet, etc. Similarly, audio/video interface board 730 is used to receive broadcast communications from any of a wide range of conventional wireline and wireless broadcast media such as RF broadcasts, satellite broadcasts, cable broadcasts, etc. Mass storage device 720 is used to provide permanent storage for the data and programming instructions to implement the above described functions, whereas system memory 714 is used to provide temporary storage for the data and programming instructions when executed by processor 702. I/O ports 726 are one or more serial and/or parallel communication ports used to provide communication between additional peripheral devices which may be coupled to system 700 (e.g., stereo speakers, etc.). Collectively, the elements coupled to system 700 are intended to represent a broad category of hardware systems, including but not limited to general purpose computer systems based on the Pentium® processor, the Pentium® Pro processor, or the Pentium® II processor commercially available from Intel Corporation of Santa Clara, Calif.

In one embodiment, video conference controller 732 includes controller 202 and video camera controller 208 including image analyzer 212 and camera controller 210. In an alternate embodiment, video conference controller 732 provides the camera controller 210, while controller 202 is embodied within processor 702, which access instructions from storage mass storage device to implement the image analyzer function 212.

In one embodiment, system 700 receives an A/V signal via network/communication interface 724 and/or audio/video tuner interface 730, and provides the functions and features described above to automatically control the video facilities of video conference station 700 in accordance with the teachings of the present invention.

It is to be appreciated that various components of system 700 may be re-arranged. For example, cache 704 may be on-chip with processor 702. Alternatively, cache 704 and processor 702 may be packed together as a "processor module", with processor 702 being referred to as the "processor core". Furthermore, mass storage device 720, keyboard and pointing device 722, and/or display device 718 and video memory 716 may not be included in system 700. Additionally, the peripheral devices shown coupled to standard I/O bus 708 may, in alternate embodiments, be coupled to high performance I/O bus 706; or, in some implementations only a single bus may exist with the components of system 700 being coupled to the single bus. Furthermore, additional components may be included in system 700, such as additional processors, storage devices, or memories.

Figure 10:
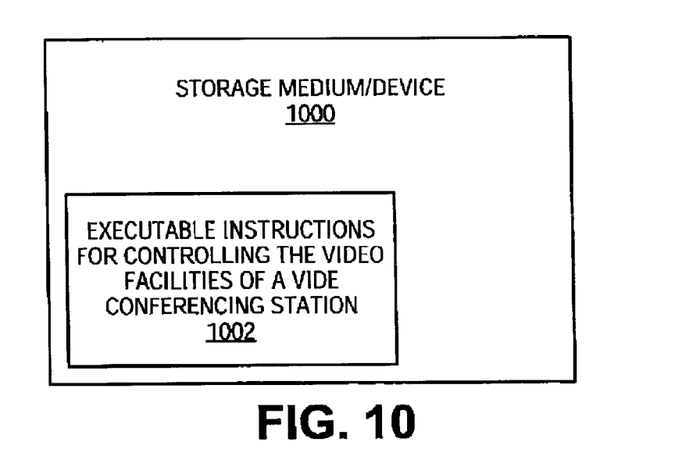
FIG. 10 is a block diagram illustration of a storage medium/device including instructions which, when executed, implement one or more aspects of the present invention, in accordance with one embodiment of the present invention.

In one embodiment, rather than including a separate video conference controller 732, the innovative features of the present invention discussed above may be implemented as a series of software routines run by system 700 of FIG. 7. These software routines run a plurality or series of instructions to be executed by a processor, such as processor 702 in system 700. Initially, the series of instructions are stored on a storage device, such as mass storage device 720. It is to be appreciated that the series of instructions may be stored on any conventional storage device, such as a diskette, CD ROM, magnetic tape, digital versatile disk (DVD) (also referred to as a digital video disk), laser disk, ROM, flash memory, etc. One such embodiment is provided with reference to FIG. 10, which depicts a storage medium/device 1000 having instructions stored thereon to implement the above described functions and features of the present invention 1002. In an alternate embodiment, the series of instructions are stored on and retrieved from a remote storage device, such as a server on a network, via network/communication interface 724. The instructions are copied from the storage device, such as mass storage device 720, into system memory 714 and then accessed and executed by processor 702. In one embodiment, these software routines are written in the C++ programming language. It is to be appreciated, however, that these routines may be implemented in any of a wide variety of programming languages. In alternate embodiments, the present invention may be implemented in discrete hardware or firmware. For example, an application specific integrated circuit (ASIC) could be programmed with the above described functions of the present invention.

Figure 8:
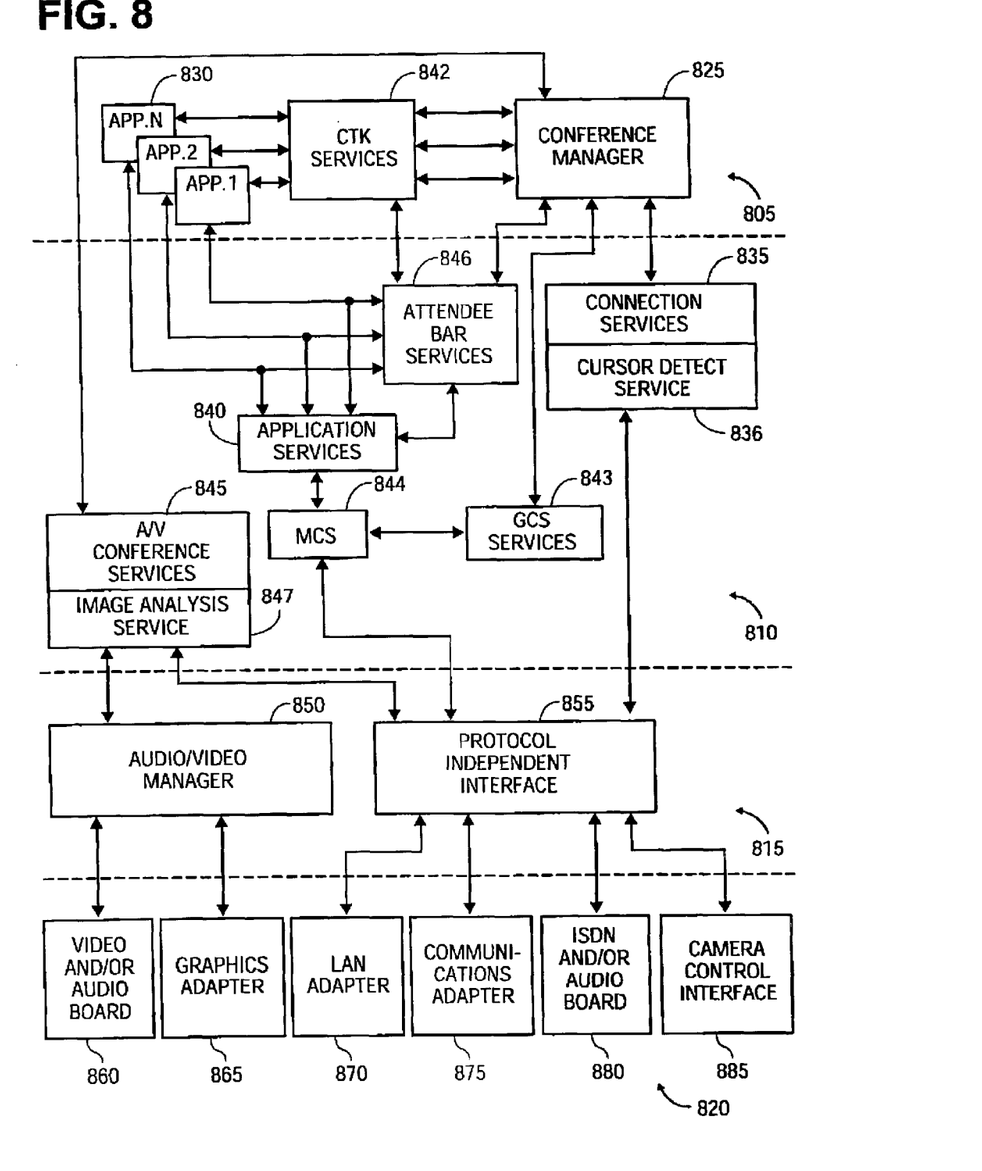
FIG. 8 is an block diagram illustration of an example software architecture for implementing the teachings of the present invention.

One example of a software architecture for automatically controlling a remote video camera in a video conferencing system is depicted in the block diagram of FIG. 8. In accordance with the illustrated example embodiment of FIG. 8, a block diagram showing an architectural overview of conferencing on a video conferencing station, according to one embodiment of the present invention, is depicted. As shown in FIG. 8, the conferencing architecture is separated into multiple layers. These layers are conference application layer 805, conference service layer 810, conference subsystem layer 815, and hardware layer 820.

Conference application layer 805 includes conference manager 825, multiple applications cumulatively referenced as 830, and connection toolkit (CTK) services 842. In accordance with one embodiment of the present invention, conference manager 825 provides a conferencing interface to the user of the video conferencing station (e.g., video conferencing station 102). In addition, conference manager 825 calculates positioning information for control camera 218 based, at least in part, on information provided by image analyzer service 847, described below, and issues camera control commands via camera control interface 885. In one embodiment, the conferencing interface is a graphical user interface (GUI) such as, for example, the conference manager 500 depicted in FIGS. 5 and 6, above. In one implementation, conference manager 825 includes options, such as through a menu, which allows the user to add or delete participants to/from the conference.

Applications 830 represent any of a wide variety of conventional software applications. In one embodiment of the present invention, one of the applications 830 is a notebook application which allows users to input text and/or drawings for the conference. In one implementation, additional applications are, for example, application sharing software, a high-quality image sharing application(s), or a file transfer application(s). It is to be appreciated that any number of applications can be executed at an appropriately configured video conferencing station.

CTK services 842 provides an interface which allows messages to be transferred between applications 830 and conference manager 825. CTK services 842 also provides an interface which allows messages to be transferred between attendee bar services 846 and conference manager 825.

Conference application layer 805 is coupled to conference service layer 810. Conference service layer 810 includes connection services 835, application services 840, generic conference control (GCC) services 843, multipoint communication services (MCS) 844, audio/video conference services 845, and attendee bar services 846. Connection services 835 establishes and maintains connections with the other video conferencing station(s). Connection services 835 interfaces between the conference subsystem layer 815 and conference manager 825 when establishing connections which are initiated by either this video conferencing station or another video conferencing station. As depicted, connection services 835 is shown comprising cursor detect service 836. As described above, cursor detect service 836 calculates the x,y position of a cursor upon receiving an appropriate interrupt from a user input device. In one embodiment, connection services 835 also includes address book services which provide services related to managing connection addresses for conference participants.

Application services 840 provides an interface between applications 830 and conference subsystem layer 815. Application services 840 also provides an interface between applications 830, and GCC services 843 and MCS 844. In one implementation, application services 840 also prevents one application from unfairly dominating the communication services of lower layers.

GCC services 843 maintains a record of the applications 830 which are executing on the video conferencing station and provides registry services to allow applications 830 to register with GCC services 843. In addition, GCC services 843 also maintains a record of current conference participants.

MCS 844 provides support for full-duplex multipoint communication among an arbitrary number of connected application entities over a variety of conventional networks. In one implementation, MCS 844 provides multipoint message routing and message broadcasting. The multipoint message routing ensures that the other video conferencing stations all receive messages from this system in the same order, and identifies the shortest path to each of the other video conferencing stations. Message broadcasting allows connection information to be broadcast to all video conferencing stations in the conference.

Audio/Video conferencing services 845 provides an interface between conference subsystem layer 815 and conference manager 825. Audio/Video services 845 provide audio and video services to conference application layer 805, such as capture and playback services for video streams. Accordingly, in one embodiment of the present invention, A/V conferencing services 845 includes image analyzer service 847 incorporating the teachings of the present invention. That is to say, in accordance with the teachings of the present invention described above, image analyzer service 847 analyzes the video feed from panoramic camera 216 to automatically detect and, if possible, identify the active participant. Once the active participant is detected, conference manager 825 through camera control interface 885 manipulates control camera 218 to "feature" the detected active speaker, and switches to transmit the video feed from the control camera 218.

Attendee bar services 846 provides support for the associating of user information with conference participants of the present invention. In one embodiment, attendee bar services 846 is a library of function calls which are available to the applications executing at a video conferencing station.

Conference subsystem layer 815 operates in a conventional manner to provide an interface between the protocol-independent conference service layer 810 and the specific protocols of the devices in hardware layer 820. Audio/video manager 850 provides an interface which receives audio and video data from audio/video conference services 845 and outputs it to the hardware layer 820 for display or audio play.

Protocol independent interface 855 provides an interface between the components of conference service layer 810 and hardware layer 820. Interface 855 receives data and messages from the components of conference service layer 810 and converts the information received to the proper format based on the hardware connected to the system.

Hardware interface layer 820 includes video and/or audio board 860, graphics adapter 860, LAN adapter 870, communications adapter 875, ISDN and/or audio board 880 and camera control interface 885. The video and/or audio board 860 and graphics adapter 865 are conventional computer system boards for realizing video and/or audio outputs. For example, the video outputs may be realized on a display device and the audio outputs may be realized via a computer system speaker. The board 860 and adapter 865 also provide sampling, digitization, compression/decompression of audio signals exchanged between two video conferencing stations over a full-duplex audio connection, as well as interfacing with the proper CODEC to compress and decompress the video signals. Camera control interface 885 interfaces with a local video camera.

Hardware layer 820 also includes a LAN adapter 870, modem 875, and ISDN and/or audio board 880. LAN adapter 870 is a conventional LAN adapter, such as an Ethernet adapter. Modem 875 is a conventional line for coupling the video conferencing station to a POTS line. ISDN and/or audio board 880 is a conventional ISDN line which can also include audio support.

It is to be appreciated that, depending on the conferencing environment, all of the components of hardware layer 820 may not be included. For example, LAN adapter 870 may not be included in one of the video conferencing stations.

Figure 9:
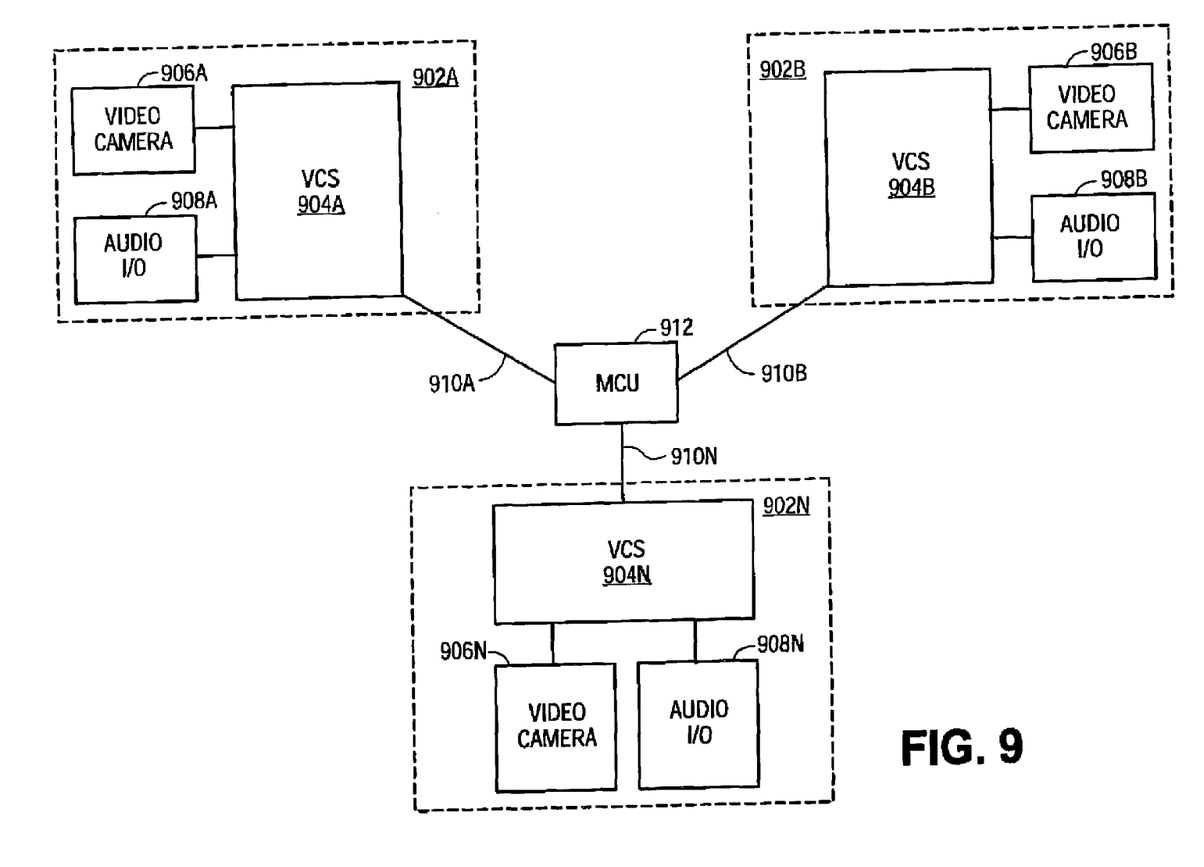
FIG. 9 is a block diagram illustration of an example video conferencing system incorporating the teachings of the present invention, in accordance with an alternate embodiment of the present invention.

While the teachings of the present invention were described above as being incorporated into each of the video conferencing stations comprising video conference system 100, those skilled in the art will appreciate that this need not be the case. FIG. 9, for example, depicts a video conference control system 900 comprising video conferencing stations 902*a*, 902*b* through 902*n*, each of which are communicatively coupled to a common multipoint control unit (MCU) 912 incorporated with the teachings of the present invention, in accordance with an alternate embodiment of the present invention. For ease of illustration, each of the video conference stations 902*a* through 902*n* have panoramic and control cameras cumulative labeled as 906*a* through 906*n*, respectively.

In accordance with the illustrated example embodiment of FIG. 9, MCU 912 incorporated with the teachings of the present invention receives the video feed from the panoramic camera of each of the video stations, detects the main speaker at each of the conference stations, and selectively manipulates the control camera at each video conference station 902*a* through 902*n* to feature the active conference participant for display at the other video conference stations. Accordingly, in one embodiment, MCU 912 is a conference station controller 203, albeit with the ability to manage multiple conference stations simultaneously.

Thus, alternative examples of a method and apparatus for controlling a video camera in a video conferencing system have been described, above, with respect to FIGS. 1 through 10. While the method and apparatus of the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A video conference station, comprising:
   an image analyzer to receive video frames from a communicatively coupled first camera, to detect one or more conference participants within the received video frames and to detect an active participant within the one or more conference participants; and
   a camera controller, coupled to the image analyzer, to control a second camera based, at least in part, on detecting the active participant, wherein the image analyzer detects one or more conference participants by detecting one or more heads in the received video frames corresponding to one or more conference participants, wherein the image analyzer detects an active participant by detecting which conference participant is currently speaking, and wherein the image analyzer detects which participant is currently speaking by analyzing the received video frame to detect motion in a lower half of the detected head of one or more conference participants.

2. The video conference station of claim 1, further comprising one or more audio input devices to capture audio of the one or more conference participants.

3. The video conference station of claim 2, wherein the conference station further utilizes the audio captured by the one or more audio input devices to detect the active participant.

4. The video conference station of claim 3, wherein the camera controller receives input from the image analyzer and the audio input devices to pan, frame and focus the second camera on the active participant.

5. The video conference station of claim 4, wherein the camera controller sends video from the first camera to a remote conference station until an active participant is identified, and the second camera has panned, framed and focused on the active participant, whereupon the camera controller sends video from the second camera.

6. The video conference station of claim 1, further comprising a storage device having stored therein a plurality of images along with associated descriptive information for each of the plurality of images.

7. The video conference station of claim 6, whereupon detecting one or more conference participants, the image analyzer compares heads of conference participants against the plurality of images stored in the storage device to identify each of the conference participants.

8. The video conference station of claim 6, wherein the image analyzer accesses the associated descriptive information for each of the conference participants and provides such information on the detected active participant to the camera controller such that the conference station sends the descriptive information along with audio and video to one or more remote conference stations.

9. A video conference station, comprising:

an image analyzer to receive video frames from a communicatively coupled first camera, to detect one or more conference participants within the received video frames and to detect an active participant within the one or more conference participants; and a camera controller, coupled to the image analyzer, to control a second camera based, at least in part, on detecting the active participant, wherein the image analyzer detects an active conference participant by analyzing the received video frames to detect motion in a lower half of detected heads associated with the one or more conference participants.

10. The video conference station of claim 9, further comprising one or more audio input devices to capture audio of the one or more conference participants.

11. The video conference station of claim 10, wherein the camera controller utilizes audio information as well as video information to detect the active conference participant.

12. A video conference system comprising a plurality of video conference stations, at least one of which comprising:

an image analyzer to receive video frames from a communicatively coupled first camera, to detect one or more conference participants within the received video frames and to detect an active participant within the one or more conference participants; and a camera controller, coupled to the image analyzer, to control a second camera based, at least in part, on detecting the active participant, wherein the image analyzer detects an active conference participant by detecting which participant is currently speaking, and wherein the image analyzer detects which conference participant is currently speaking by analyzing the received video frames to detect motion in a lower half of detected heads associated with the one or more conference participants.

13. The video conferencing system of claim 12, further comprising one or more audio input devices to capture audio of the one or more conference participants.

14. The video conferencing system of claim 13, wherein the camera controller utilizes audio information as well as video information to detect the active conference participant.

15. A method for featuring an active video conference participant in a video conferencing session, the method comprising:

(a) analyzing at least a subset of video frames received from a first video camera to detect an active participant from one or more detected conference participants; and (b) controlling a second video camera to frame and focus the second video camera on the active participant based, at least in part, on the result of said analysis, wherein detecting the active participant comprises:

receiving two or more video frames from the first video camera; detecting one or more conference participant heads; and monitoring a portion of the received video frames associated with a lower half of each of the one or more detected conference participant heads for movement denoting speech.

16. The method of claim 15, wherein detecting the active participant further comprises analyzing audio input from one or more audio input devices to identify which portion of the received video frames should be analyzed.

17. The method of claim 15, further comprising:

(c) selecting a video feed from the second camera, while continuing in parallel with steps (a) and (b).

* * * * *